(12) United States Patent
Winner et al.

(10) Patent No.: US 6,311,117 B1
(45) Date of Patent: Oct. 30, 2001

(54) METHOD AND ARRANGEMENT FOR CONTROLLING THE SPEED OF A VEHICLE

(75) Inventors: Hermann Winner, Karlsruhe; Stefan Witte, Minden, both of (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 08/890,933

(22) Filed: Jul. 10, 1997

(30) Foreign Application Priority Data

Jul. 10, 1996 (DE) .............................. 196 27 727

(51) Int. Cl.$^7$ .............................. B60T 8/32; G06F 7/00
(52) U.S. Cl. .............................. 701/93; 701/95; 180/170
(58) Field of Search .............................. 701/93, 97, 110, 701/35, 96, 95; 180/170, 169, 179, 197, 177, 176; 364/528.39; 123/352, 350

(56) References Cited

U.S. PATENT DOCUMENTS

| | | | |
|---|---|---|---|
| 4,337,511 | 6/1982 | Schneider et al. ............ | 180/179 |
| 4,394,739 | * 7/1983 | Suzuki et al. ............ | 701/97 |
| 4,437,442 | * 3/1984 | Yamaguchi ............ | 477/111 |
| 4,451,890 | * 5/1984 | Suzuki et al. ............ | 701/97 |
| 4,463,822 | * 8/1984 | Tanigawa et al. ............ | 180/177 |
| 4,516,652 | * 5/1985 | Tanigawa et al. ............ | 180/177 |
| 4,535,864 | * 8/1985 | Tanigawa et al. ............ | 180/177 |
| 4,535,865 | * 8/1985 | Tanigawa et al. ............ | 180/177 |
| 4,736,813 | * 4/1988 | Hayama et al. ............ | 180/177 |
| 4,835,696 | * 5/1989 | Suzuki et al. ............ | 701/93 |
| 5,113,963 | * 5/1992 | Sigl et al. ............ | 701/84 |
| 5,216,609 | * 6/1993 | Oo ............ | 701/93 |
| 5,333,109 | * 7/1994 | Oo et al. ............ | 701/93 |
| 5,390,637 | * 2/1995 | Yoshioka et al. ............ | 123/333 |
| 5,400,864 | * 3/1995 | Winner et al. ............ | 701/96 |
| 5,794,735 | * 8/1998 | Sigl ............ | 701/95 |

FOREIGN PATENT DOCUMENTS 4338399    5/1995   (DE) .

OTHER PUBLICATIONS

"Adaptive Cruise Control, System Aspects and Development Trends" by H. Winner et al, 1996, SAE Paper No. 961010.

* cited by examiner

*Primary Examiner*—Jacques H. Louis-Jacques
(74) *Attorney, Agent, or Firm*—Walter Ottesen

(57) ABSTRACT

The invention is directed to a method and an arrangement for controlling the road speed of a vehicle having a road speed controller. The resumption of the control by the driver at the stored desired speed is delayed in at least one operating situation after the road speed control is switched off.

7 Claims, 4 Drawing Sheets

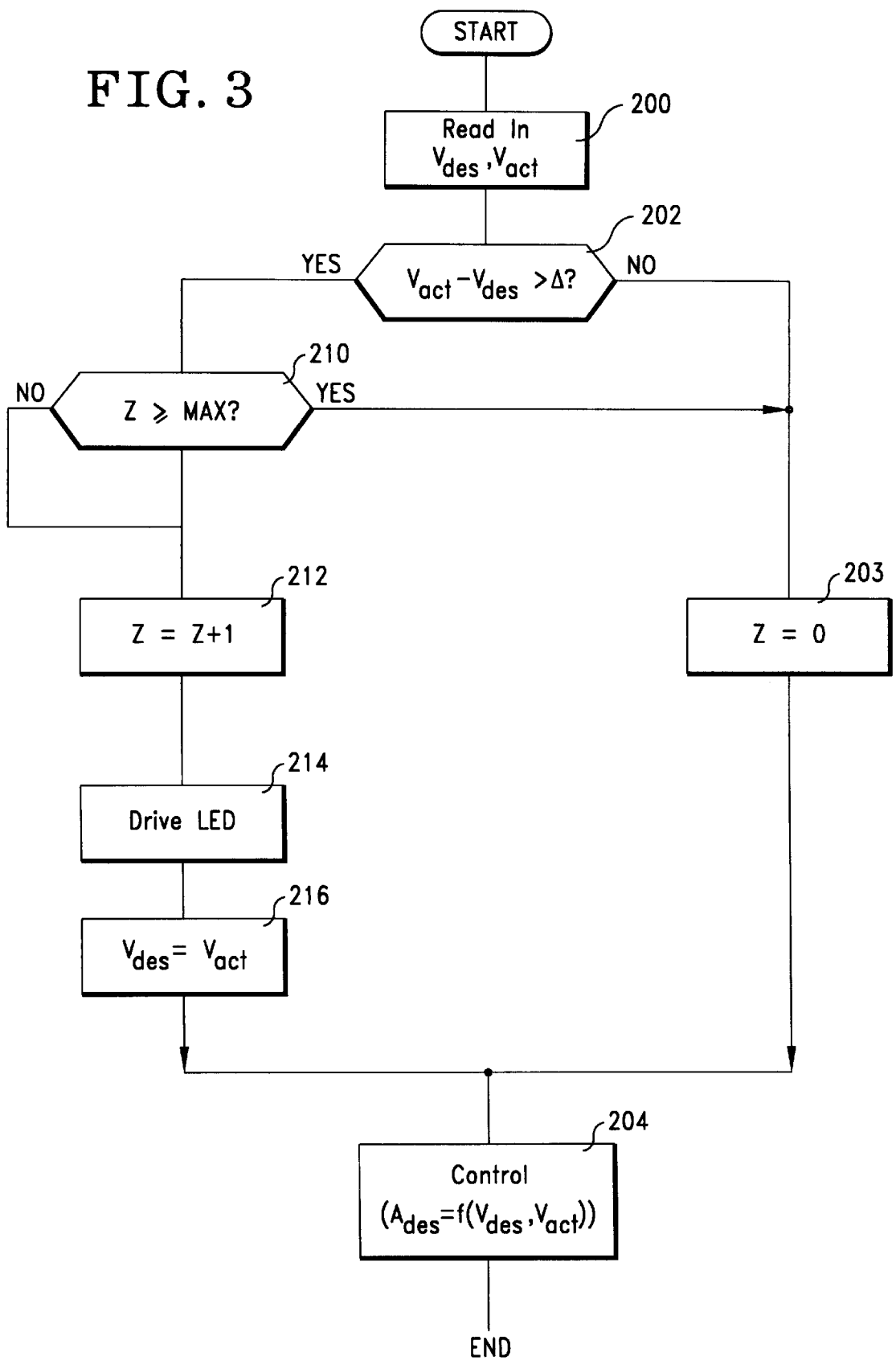

METHOD AND ARRANGEMENT FOR CONTROLLING THE SPEED OF A VEHICLE

BACKGROUND OF THE INVENTION

Methods and arrangements for controlling the speed of vehicles are known from the state of the art in many variations. For example, SAE Paper No. 961010 entitled "Adaptive Cruise Control, System Aspects and Development Trends" (1996) discloses a road speed controller while considering the spacing to the vehicle ahead. The driver inputs the desired speed of the vehicle via an operator adjustable lever with the functions which are customary for road speed controllers, such as setting a speed, resume speed, accelerate, et cetera. The desired speed is controlled in a manner comparable to a conventional vehicle road speed controller when a forward vehicle is not present in that a desired acceleration $a_{FGR}$ is computed from the difference between the desired and driving speeds. If a radar system detects a forward vehicle, then the spacing and the relative speed to this vehicle are determined. The control task in this case is that the relative speed is controlled to zero and simultaneously a desired spacing is maintained which is dependent upon speed. Parameters for determining the desired spacing (time gap) are adjustable by the driver. This follower controller determines a desired acceleration $a_{fol}$ from the above-mentioned variables. The desired acceleration $a_{fol}$ is, however, limited by the acceleration $a_{FGR}$ so that the pregiven desired speed cannot be exceeded even in the follower control. Distance controllers and speed controllers provide desired values for the acceleration and deceleration, respectively, of the vehicle in dependence upon the operating state. These desired values can be adjusted by influencing the engine of the vehicle and/or the brakes.

German patent publication 4,338,399 discloses a road speed controller wherein a desired acceleration of the vehicle is pregiven on the basis of the difference between the desired and actual speeds. This desired acceleration is adjusted by controlling the engine and/or by actuating the wheel brakes of the vehicle.

U.S. Pat. No. 4,337,511 discloses a road speed controller wherein the vehicle speed is adjusted only by influencing the engine power. A time-dependent change of the desired speed is provided in dynamic operating states, namely, during acceleration, deceleration and resume speed. This desired speed guides the vehicle with a pregiven acceleration or deceleration to the desired or stored desired value.

In all of these road speed controls, an operating state can occur wherein the road speed controller is switched off for time intervals and the vehicle moves at a significantly higher speed than the speed which is stored in the previous control operation.

This operating state can, for example, occur when the driver actuates the accelerator pedal to accelerate and increases the speed of the vehicle considerably above the stored desired speed.

In such operating situations, a reduction in comfort can occur with the actuation of the resume-speed key of the road speed controller because the road speed controller greatly decelerates the vehicle to reach the stored speed which is lower than the actual speed.

SUMMARY OF THE INVENTION

It is an object of the invention to improve driving comfort in the above-mentioned operating situations.

The method of the invention is for controlling the road speed of a vehicle having a road speed controller wherein the road speed is controlled in accordance with the stored desired speed pregiven by the driver and the actual speed, the road speed controller being adapted to permit the driver to again resume the control with the stored desired speed after the road speed controller has been switched off. The method includes the step of delaying the resumption of the stored desired speed in at least one operating situation.

With the invention, unintended decelerations of the vehicle are prevented when the road speed control is resumed.

The driving comfort is improved in an advantageous manner in this way. Furthermore, the driver and drivers of rearward vehicles are not irritated by unmotivated deceleration operations which offers considerable comfort advantages especially for road speed controllers with brake intervention as is often realized in adaptive road speed controllers (road speed controllers in combination with range control).

In an advantageous embodiment of an adaptive road speed controller, it is especially advantageous that, with the solution of the invention, no disadvantageous effects occur for a slower lead vehicle because in this case, the range control remains fully effective.

BRIEF DESCRIPTION OF THE DRAWINGS

The invention will now be described with reference to the drawings wherein:

FIG. 3 shows an embodiment of the method of the invention in the context of a flowchart which defines a program executed in a microcomputer of the control arrangement;

DESCRIPTION OF THE PREFERRED EMBODIMENTS OF THE INVENTION

The solution according to the invention is shown below with respect to a preferred application of an adaptive road speed controller. The solution of the invention is however also realized in an advantageous manner in the context of additional embodiments of a road speed control of a vehicle.

Figure 1:
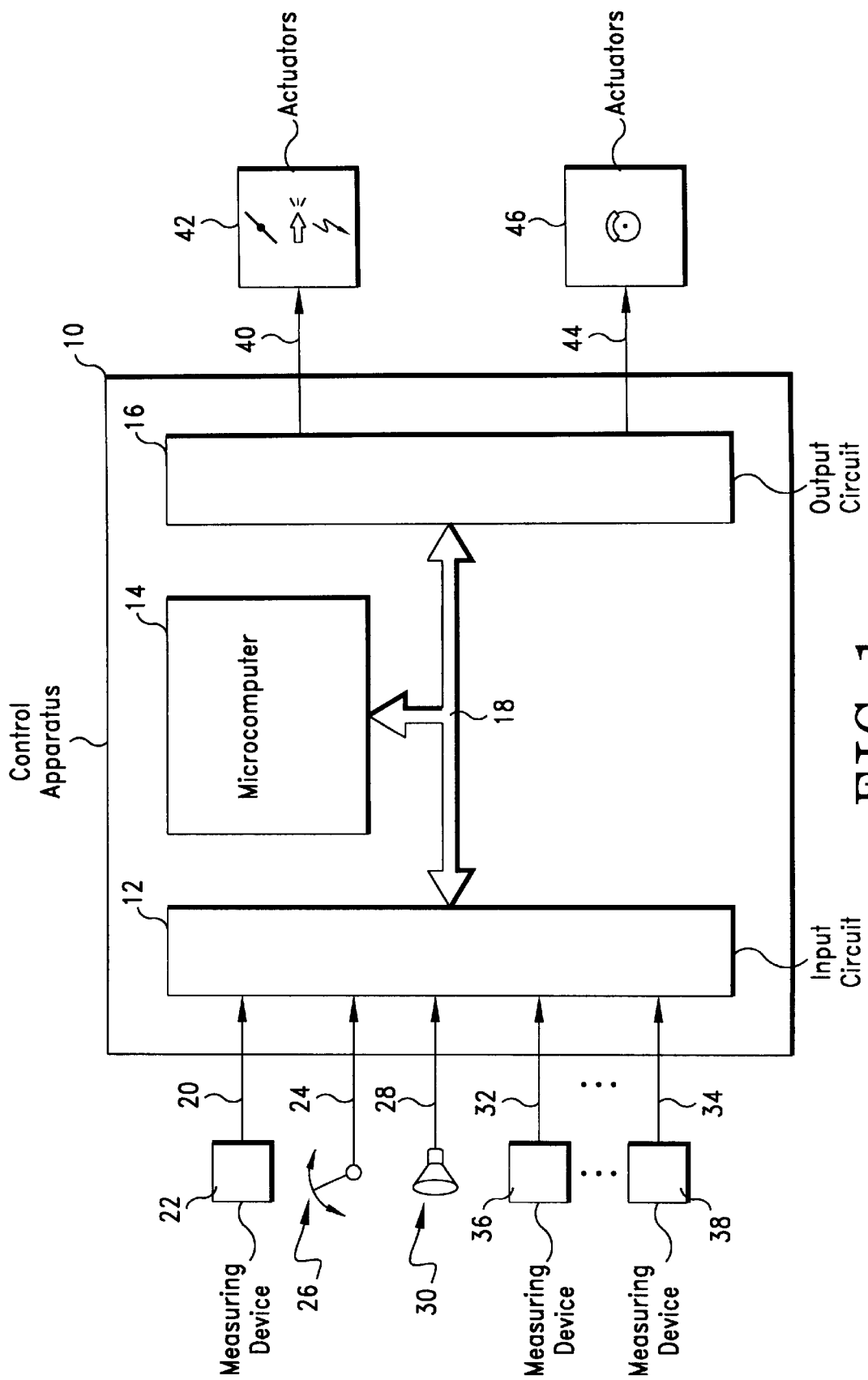
FIG. 1 is an overview block diagram of a control arrangement for controlling the road speed of a vehicle.

FIG. 1 is an overview block diagram of a control apparatus 10 for an adaptive road speed controller. The control apparatus 10 includes an input circuit 12, at least one microcomputer 14 and an output circuit 16. These elements are interconnected via a communication system 18 for exchanging data and information. Input line 20 from a measuring device 22 for detecting the road speed is connected to the input circuit 12 as is a line 24 from an operator-actuated element 26 for inputting the operating state of the road speed controller and the desired spacing. An output line 28 from a range measuring device 30 such as a radar apparatus is also connected to the input circuit 12. Additional input lines 32 to 34 from measuring devices 36 to 38, respectively, for detecting additional operating variables of the vehicle are connected to input circuit 12. Operating variables of this kind are used for the adaptive road speed control and are, for example, steering angle, transverse acceleration, et cetera. The microcomputer 14 of the control unit 10 influences the power of the drive unit of the motor vehicle in the context of an adaptive cruise control via at least an output line 40 and corresponding actuators 42 (for example, electronic motor control apparatus). Furthermore, and in a preferred embodiment, the control unit 10 influences the braking force at the wheel brakes of the vehicle via the output line 44 and corresponding actuators 46 (for example, of braking devices equipped with ABS/ASR elements).

Figure 2:
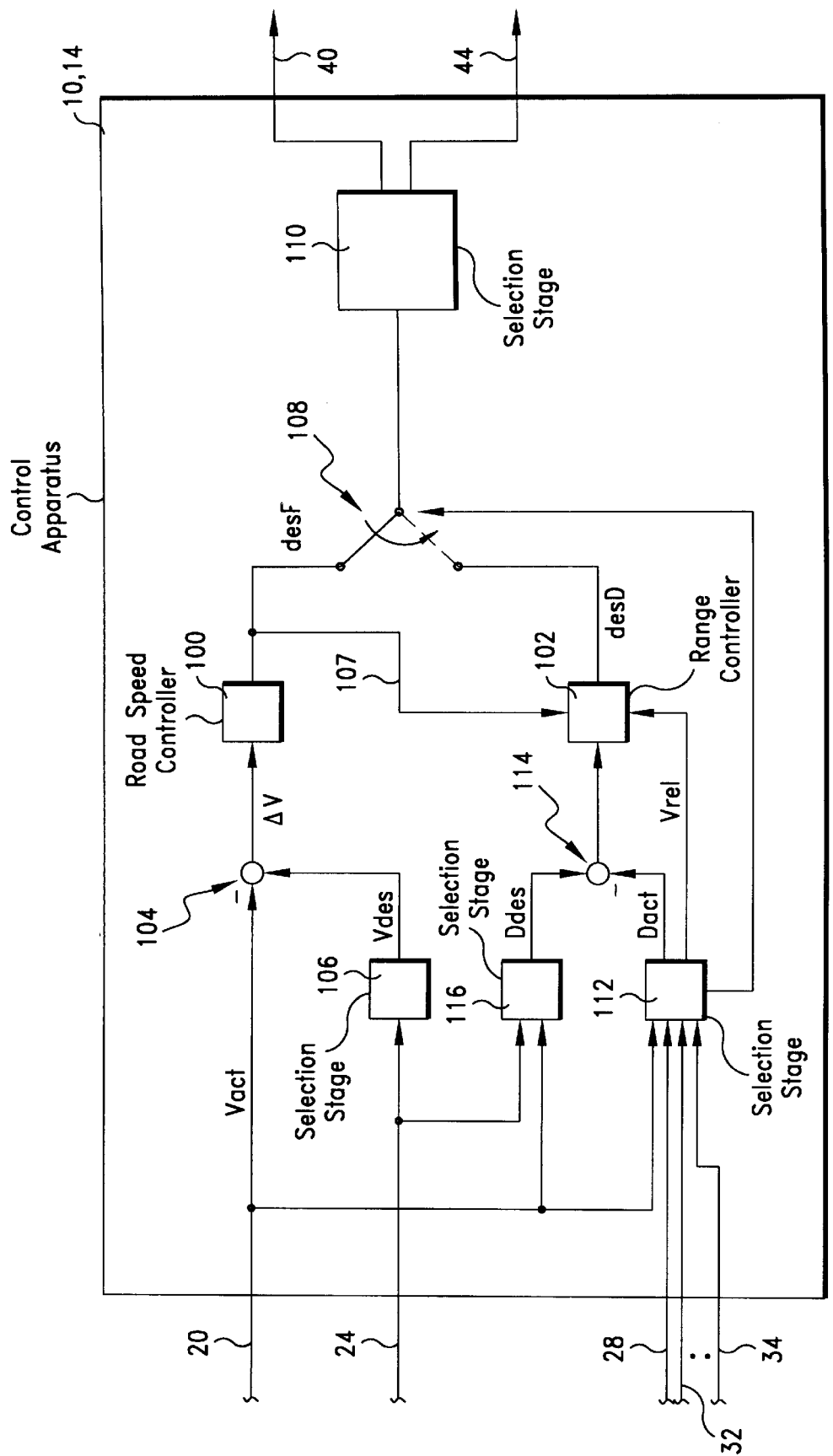
FIG. 2 is a detail view of an adaptive speed controller.

The basic principle of adaptive cruise control known from the above-mentioned state of the art is shown in FIG. 2 in the context of a block circuit diagram which shows the basic relationships for an adaptive road speed control (adaptive cruise control). The realization of road speed control is achieved in the preferred embodiment as a program of the microcomputer 14 which realizes the relationships shown in FIG. 2.

The adaptive cruise control includes two basic functions, namely, the road speed controller 100 and the range controller 102. The road speed controller 100 is realized in a conventional manner and is supplied from a comparator 104 with the difference $\Delta V$ between the desired speed $V_{des}$ and the actual speed $V_{act}$. The desired speed $V_{des}$ is determined in dependence upon the actuating state of the operator-controlled element 21 in a selection stage 106. Thus, for example in the operating state "set", the actual speed value is assumed as the desired speed and, in the operating state "acceleration", ramps of the desired speed which change as a function of time are pregiven. The output signal desF is formed by the road speed controller 100 in dependence upon the speed difference in accordance with a pregiven control strategy (for example, PD control). The output signal desF is outputted to a switching element 108 and to the controller 102 via the line 107. Depending upon the switching position of the switching element 108, the output signal desF of the road speed controller or the output signal desD of the range controller 102 is conducted to a selection stage 110. The selection stage 110 forms a control signal for influencing the engine power (output line 40) or the braking force (output line 44) in dependence upon the supplied output signal. The range controller 102 includes a selection stage 112 which determines the relevant vehicle which is to be used as the forward vehicle for range control. This is determined by the selection stage 112 in dependence upon the radar signals, which are supplied via the input line 28, the actual speed and variables such as steering angle, rate of yaw and acceleration of the vehicle. These variables are supplied via lines 32 to 34.

The expected course of the vehicle is determined based on the speed and, if required, on the steering angle. The radar sensor supplies the distance to the detected objects, the relative speed and the angle to the various objects so that the relevant vehicle is selected from a comparison of the supplied data to the expected future course of the vehicle. Then, the values determined by the radar sensor for the distance to the relevant vehicle $D_{act}$ and its relative speed $V_{rel}$ are outputted. The actual distance is supplied to a comparator stage 114 in which the difference is formed between the desired spacing $D_{des}$, which is pregiven by the driver, and the determined actual spacing and is supplied to the range controller 102. The relative speed is also transmitted to the range controller 102 from the selection stage 112. The desired distance to the relevant forward vehicle is determined in a selection stage 116 in dependence upon an actuating signal of the driver, which fixes the desired time distance to the forward vehicle in seconds, and the actual speed. The range controller 102 forms an output signal desD with which the distance difference as well as the relative speed of the forward vehicle are guided to zero. The desired quantity of the road speed controller 100 is supplied to the range controller 102 so that the pregiven desired speed cannot be exceeded. The output signal desD is supplied to the switch element 108. The switch element 108 is switched over into the position shown in phantom outline when a forward vehicle is detected and to which the spacing is to be adjusted. This means that the road speed controller 100 determines engine power and brake power in accordance with its input quantities when no vehicle is determined for distance or range control; whereas, for a detected forward vehicle, the range controller 102 controls engine power and braking power. The selection stage 110 decides whether the engine control or the brake control is activated in dependence upon the supplied desired value which corresponds essentially to a desired acceleration or deceleration. If the reduction of engine power is not sufficient to hold the desired deceleration, then the brakes are activated; otherwise, the deceleration control is carried out via a control of the engine power.

The above-described principle operation of the adaptive cruise control is known from the state of the art. For example, if the vehicle travels with a higher speed than the stored desired speed of the road speed controller and if the adaptive cruise control is again activated in such an operating state by actuating the resume key with the last set desired speed, then unwanted reactions can occur when the road speed controller realizes the vehicle deceleration, which is required to control to the stored desired speed, via a large torque reduction and/or an active brake intervention. In order to prevent this, it is provided that, when actuating a resume key of the road speed controller, a check is made as to whether the stored desired speed $V_{des}$ is significantly less than the actual speed of the vehicle. If this is the case, then a delayed resumption of the old set speed takes place.

In a preferred embodiment, and for an applicable time duration, the actual road speed is used as the set speed. At the same time, the driver is made aware of this special transition state via a suitable display concept (for example, a blinking display lamp for the old stored desired speed). In this way, the possibility is afforded the driver to adapt the stored desired speed via intervention at the operator-controlled element, that is, to set the desired speed to a greater value. In this way, the driver can avoid the vehicle deceleration which is not wanted. If no appropriate intervention occurs by the driver, then, after the pregiven time duration has elapsed, the old stored desired speed is assumed and the deceleration of the vehicle is initiated.

In addition to assuming the actual speed as the desired speed during the deceleration time, an alternative can be provided in that the desired speed is reduced in the direction toward the desired speed starting from the actual speed so that the road speed controller already effects a slight deceleration of the vehicle during the delay time.

The realization of this solution of the invention in a preferred embodiment is shown in the flowchart of FIG. 3.

The program shown in FIG. 3 is started with the activation of the road speed controller, for example, by actuating the resume key by the driver. In the first program step 200, the stored desired speed $V_{des}$ and the actual speed $V_{act}$ are read in. In the subsequent inquiry step 202, the difference of the actual speed and the desired speed is compared to a threshold value $\Delta$. If the difference is less than this threshold value Δ (the threshold value Δ is constant or, for example, dependent upon the actual engine power, the actual road speed, et cetera), then, in accordance with step 203, a counter Z is set to zero and, in accordance with step 204, the road speed control is executed while considering the stored desired speed in that a desired acceleration $A_{des}$ is formed in dependence upon the stored desired speed $V_{des}$ and the actual speed. This desired acceleration $A_{des}$ is realized by increasing or reducing the engine power and, if required, by intervening with the brakes. The program is then ended and repeated at a given time.

If, in step 202, it is determined that the difference between the actual and desired speeds is greater than the threshold value Δ, then, in the next step 210, a check is made as to whether the counter Z has reached its maximum value or exceeded this maximum value. The counter Z is set to zero when the controller is activated.

If the counter has reached or exceeded its maximum value, then the control is executed in accordance with step 204. If the count of the counter is below the maximum value, then the counter is incremented in the next step 202 and, in an optional step 214, this transitional state is made clear to the driver. This is achieved, for example, in that a luminescent diode blinks in the display instrument of the speed for the stored low set speed and, if necessary, is reinforced by further measures such as an acoustic warning, et cetera.

In the next step 216, the desired speed is set to the value of the actual speed or to a value derived therefrom and, in the next step 204, the control is carried out on the basis of this desired value. The adaptation of the desired speed in accordance with step 216 is undertaken only for one program runthrough. The desired speed read in in step 200 is the stored speed pregiven by the driver and changed, as required, by the driver in the meantime.

Figure 4A:
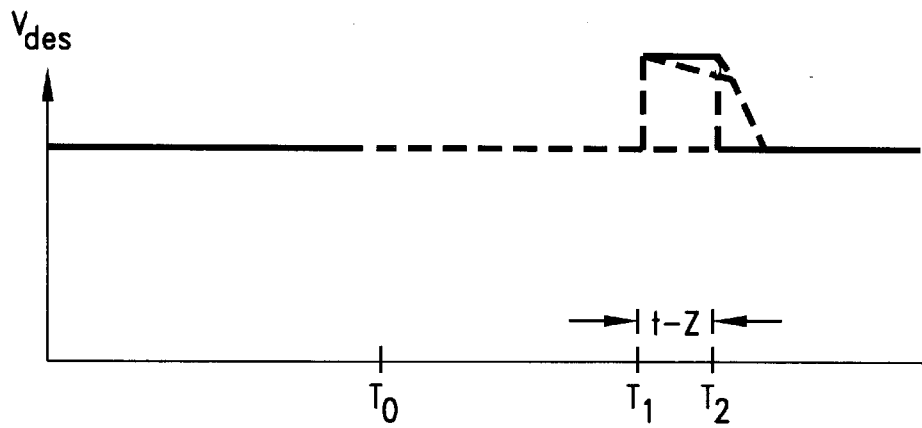
FIG. 4a is a graph showing the desired speed plotted as a function of time.
Figure 4B:
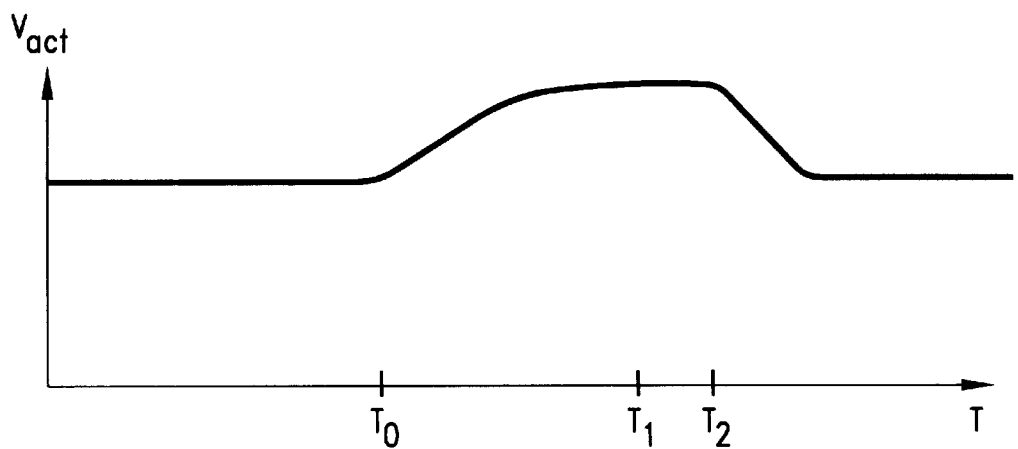
FIG. 4b is a graph showing the actual speed as a function of time.
Figure 4C:
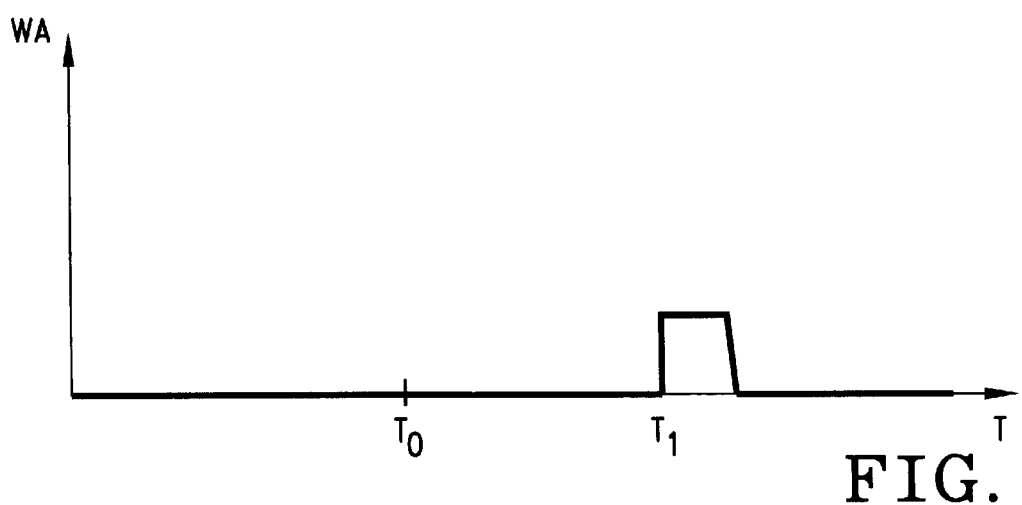
FIG. 4c is the resume signal WA plotted as a function of time.

The operation of the solution of the invention is shown in FIGS. 4a to 4c with respect to time diagrams. Here, FIG. 4a is the time-dependent trace of the desired speed and FIG. 4b is the actual speed as a function of time. FIG. 4c shows the resume signal WA also as a function of time.

First, the vehicle is controlled to a predetermined desired value under the action of the road speed controller. At time point $t_0$, there is a movement out of the road speed control and the speed of the vehicle is increased by actuating the accelerator pedal. Thereafter, the controller is switched off and, at time point $t_1$, the controller is again actuated by actuating the resume key. According to the invention, this leads to a delayed resumption. Up to time point $t_2$, the driver is offered the possibility, at constant speed, to adapt the desired speed for improving comfort.

If this does not take place up to time point $t_2$, then the desired speed, which is set to actual speed in the time span between $t_1$ and $t_2$, is reduced slowly or abruptly to the originally stored value. Starting at time point $t_2$, a deceleration is initiated so that the vehicle is decelerated to the originally pregiven desired speed if the driver has not undertaken an adaptation of the desired speed.

The solution of the invention is utilized in combination with adaptive cruise control or for road speed controllers with and without brake intervention. The delay of the resumption takes place by means of a constant desired speed during the delay time or via a desired speed as a function of time in a direction toward the resume speed.

It is understood that the foregoing description is that of the preferred embodiments of the invention and that various changes and modifications may be made thereto without departing from the spirit and scope of the invention as defined in the appended claims.

What is claimed is:

1. A method for controlling the road speed of a motor vehicle having a road speed controller wherein the road speed is controlled in dependence upon a stored desired speed (Vdes) pregiven by the driver and an actual speed (Vact) of said motor vehicle and said road speed controller being configured so that said controller allows said driver to resume (WA) the control utilizing said stored desired speed after said road speed controller is switched off, the method comprising the steps of:

detecting the actual speed (Vact) of said motor vehicle;

determining whether said actual speed (Vact) is greater than said stored desired speed (Vdes);

delaying a resumption of said control by said road speed controller for a pregiven time duration when said resumption is actuated by said driver and said actual speed (Vact) is greater than said stored desired speed (Vdes); and, after said pregiven time duration has elapsed, decelerating said motor vehicle in such a manner that said actual speed (Vact) approaches said stored desired speed (Vdes).

2. The method of claim 1, wherein said road speed controller is combined with a range controller.

3. The method of claim 1, wherein the delay of said resumption is carried out by inputting a desired speed derived from said actual speed.

4. The method of claim 3, wherein the delay of said resumption is carried out by inputting the actual speed then present as the desired speed.

5. The method of claim 4, wherein said motor vehicle is provided with a speed display; and, wherein the operating situation of said actual speed (Vact) is greater than said stored desired speed (Vdes) is indicated to the driver by a blinking luminescent diode of the speed display at said stored desired speed.

6. The method of claim 5, wherein said road speed controller is adapted to determine a desired deceleration in accordance with said desired speed and said actual speed; and, said desired deceleration being realized by reducing the motor power and/or by activating the brake system of the vehicle.

7. An arrangement for controlling the road speed of a motor vehicle operated by a driver, the arrangement comprising:

means for detecting the actual speed (Vact) of said motor vehicle;

a road speed controller for controlling said road speed in dependence upon a stored desired speed (Vdes) pregiven by the driver and said actual speed (Vact);

means for permitting said driver to resume (WA) the control of said road speed with said stored desired speed (Vdes) after said road speed controller has been switched off;

means for determining whether said actual speed (Vact) is greater than said stored desired speed (Vdes);

means for delaying the resumption of the control of said road speed for a pregiven time duration when said resumption is actuated by said driver and said actual speed (Vact) is greater than said stored desired speed (Vact); and, means for decelerating said motor vehicle in such a manner that said actual speed (Vact) approaches said stored desired speed (Vdes) after said pregiven time duration has elapsed.

* * * * *